United States Patent [19]

Kornylak

[11] 3,844,406
[45] Oct. 29, 1974

[54] ROTATING CABLE CONVEYOR

[75] Inventor: Andrew T. Kornylak, Hamilton, Ohio

[73] Assignee: Kornylah Corporation, Hamilton, Ohio

[22] Filed: Nov. 17, 1972

[21] Appl. No.: 307,423

[52] U.S. Cl. ............................................. 198/213
[51] Int. Cl. ............................................ B65g 33/00
[58] Field of Search .......................... 198/204, 213

[56] References Cited
UNITED STATES PATENTS
3,141,545  7/1964  Holland ............................. 198/204
3,491,873  1/1970  Fauth .................................. 198/204

Primary Examiner—Richard E. Aegerter
Attorney, Agent, or Firm—Thomas E. Beall, Jr.

[57] ABSTRACT

In a conveyor of the type wherein a load supporting hook is carried by an upwardly opening stationary channel having therein a rotatable threaded shaft for driving the hanger, the channel for receiving the threaded shaft is of substantially the same internal diameter as or slightly greater than the external diameter of the shaft, and extends for substantially greater than 180° of a circle. The channel is formed by a rigid supporting member and an upper bearing material strip, preferably of extruded synthetic resin plastic forming the opposed sharp edges of the channel that will extend around the outer surface of the shaft for retaining the shaft against lateral movement out of the channel opening. The strip further forms two slide bearing surfaces for the hanger on each side of the shaft to support the entire load. The strip may be secured by interengaging portions and/or bonding.

7 Claims, 5 Drawing Figures

ROTATING CABLE CONVEYOR

BACKGROUND OF THE INVENTION

Screw conveyors of the type wherein a helically threaded flexible shaft received within an upwardly opening channel of a support rail is rotated to provide linear movement of a load supported by a hanger having a hook portion engaging the helical threads have been for some time and have many advantages in that the assembly may be bent, within fairly liberal ranges to provide a desired conveyor path, without requiring any return portion, for example as would be required in an endless conveyor. However, many problems exist with respect to this type of conveyor. If the hook portion of the hanger engages the roots of the helical threads there is the problem of considerably friction due to wedging with small pitch thread and instability, in the conveying direction for tilting with a larger pitch, although the larger pitch would reduce the wedging action friction. Further, with the hook portion vertically engaging the shaft for load support, an effective fulcrum is provided at this engagement point for rocking of the load in a plane transverse to the conveying direction. The above instability problems with respect to rocking generally in a horizontal plane about a vertical axis due to large thread pitches and rocking in a plane perpendicular to the conveying direction due to fulcrum point engagement may be eliminated by providing vertical load bearing engagement only between the opposite outer side surfaces of the rail portion forming the channel and surfaces of the hook spaced on opposite sides of a central portion of the hook that has only side engagement with the helical threads, that is no root engagement. Such rail support for the hook further eliminates the problem of wedging mentioned above. However, with vertical load bearing support being provided by opposite surfaces of the rail, there is the quite different problem of considerable friction, since the support surfaces are greatly multiplied over those wherein support is provided by the shaft. This increased friction will produce metal powdering between the hook and the rail, particularly where the rail is of a soft metal that may be easily bent and extruded, for example aluminum. Further, with heavier loads the hook will tend to ride up over the helical threads so that drive will cease. While a liquid or powdered lubricant may be provided for the outer surface of the rail where the hook engages, since there is sliding contact the hooks will wipe the surface clean and the lubricant will fall freely to the work area below.

Further, there is a lubrication problem between the flexible shaft and the rail channel, which is compounded when the shaft must carry the vertical load of the hanger, because this load is merely transferred to the lower bearing surface between the flexible shaft and the channel. While the channel shape will tend to retain lubricant, there is still a considerable problem involving the collection of dirt and the like within the channel of the lubricant and a general dirt problem involving the lubricant escaping. While many of the friction problems between the flexible shaft and channel are to some degree eliminated by the liner of the Holland Pat. No. 3,141,545 issued in 1964, considerable problems still remain in this specific area.

There are many factors limiting the turning radius of the conveyor in both a horizontal plane and a vertical plane, a major one of which is the increased friction caused by such turning between the rotating flexible shaft and the opposed sides of the channel for horizontal plane bends, and increased friction between the shaft and the lower portion of the channel as well as the inner surface of the inwardly turned portions of the channel, if present. The liner of the Holland patent only partially solves these problems and will not at all solve the problems with respect to the inturned ends of the channel. It is desirable to provide the channel with a circular arc configuration of greater than 180° to restrain movement of the flexible shaft out of the channel, particularly for vertical plane bends; however as mentioned, this will produce considerable friction, which is compounded by a wedging action and only small surfaces being available that face downwardly and engage the flexible shaft.

If the above mentioned channel were made with an internal surface that in cross section extends for more than 180° of a circle to at least prevent movement of the shaft out of the channel during vertical plane bends, there would of necessity be the problem that the shaft could be inserted in the channel only from one end, which presents considerable problems with respect to handling of the shaft, placement of the conveyor end, and length of the conveyor, as well as perhaps difficulties in coupling shaft sections. If the channel extended for 180° or less so that the shaft could be laterally inserted within the channel, it would be quite easy for the shaft to jump out of the channel for both vertical and horizontal plane bends, particularly the former.

SUMMARY OF THE DISCLOSURE

The conveyor for linearly moving load carrying hangers employs a structural metallic rail that generally may define a desired path for the conveyor and which has an upwardly opening arcuate channel, a preferably synthetic resin bearing material covering the outer surface of the upper portion of the rail, a flexible cable or drive shaft having a helical thread on its outer surface and being received within the channel, with the bearing material therebetween, and a hanger engaging the opposite upper edges of the channel — with the bearing material interposed for supporting the entire weight of the hanger — and drivingly engaging with its sides the helical thread of the shaft. The bearing material defines an internal surface that is generally substantially over 180° of a circle in cross-section with an inner diameter substantially the same as and preferably 0.010 inches larger than the outer diameter of the outer helical shaft threads, so as to securely guide and hold the shaft in position during rotation of the shaft despite shaft, rail and bearing material vertical or horizontal bends as dictated by the desired conveyor path.

The bearing material is preferably rigid but may be sufficiently resilient to provide a snap fit for receiving the shaft therein in a transverse direction. Both the rail and bearing material may be extruded in continuous lengths, with the bearing material being preferably ultrahigh molecular weight polyethylene, glass filled teflon or nylon, for example. The opposed upper edges of the bearing material strip are in the form of acute angle lips tapering to a sharp edge for retaining the shaft within the channel. The bearing material extends downwardly along the outer surfaces of the rail channel defining sides away from its upper edges to form opposed bearing supports for the hanger hook portion and further to provide lower reverse bend portions that may interlock with a suitably formed channel or shoulder of the rail. Further, the bearing material strip may be bonded to the rail.

BRIEF DESCRIPTION OF THE DRAWING

Further objects, features and advantages of the present invention will become more clear from the following detailed description of a preferred embodiment of the present invention, with variations, as shown in the attached drawing, wherein.

DETAILED DESCRIPTION OF THE DRAWING

Figure 1:
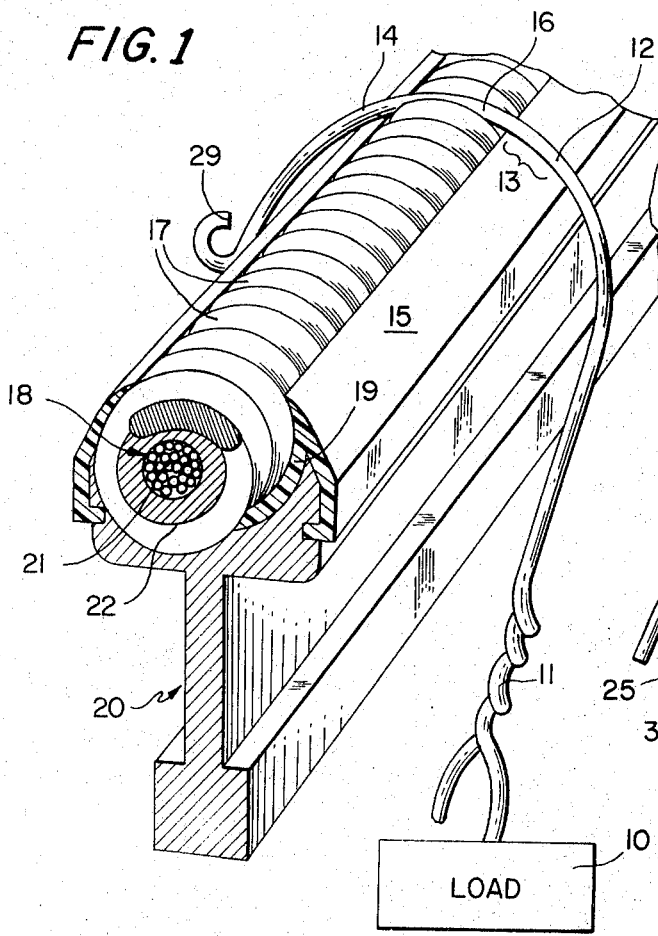
FIG. 1 is a partial perspective view of a conveyor according to the present invention provided with the hook portion of a load carrying hanger.

With the preferred embodiment of the present invention as shown in FIG. 1, a load 10 may be supported by means of a hanger 11 having an upper hook portion 12. The hook portion engages spaced areas 13, 14 of a guide, retainer and bearing strip 15 for vertical support of the load. The sides of the central portion 16 of the hook 12 will be engaged by the sides of the helical threads 17 to move the hanger in a linear direction. Threads 17 are carried on a flexible shaft 18, which is rotatable within a channel 19 of the strip 15. The strip 15 is carried by the upper end of a generally I-beam shaped rail 20.

Preferably, the rail 20 is cut and assembled from continuous extruded lengths of a light weight, relatively easily bendable and strong material, for example aluminum, magnesium, or alloys thereof. The rail 20 may be bent along arcuate paths in vertical planes, horizontal planes, or intermediate incline planes. As an example, these bends may have a 4 foot radius.

Preferably, the shaft 18 is composed of a central core 21 that may be a twisted steel cable, an intermediate layer 22, which may be a tightly wound heavy gauge steel wire completely enclosing the cable 21, and an outer heavy gauge single wire loosely wound on the intermediate layer 22 to form the helical threads 17. Preferably, the wire forming the threads 17 and the wire forming the intermediate layer 22 are of substantially the same gauge steel, and are wound in the same direction with the thread pitch 17 being twice that of the intermediate layer 22, so that the wire forming the threads 17 may be received generally between alternate pairs of intermediate layer coils. With the intermediate layer being tightly wound, this will assure uniform, precise and stable spacing of the helical threads 17, while providing sufficient flexibility for the above-mentioned bends and strength for the desired function.

Figure 2:
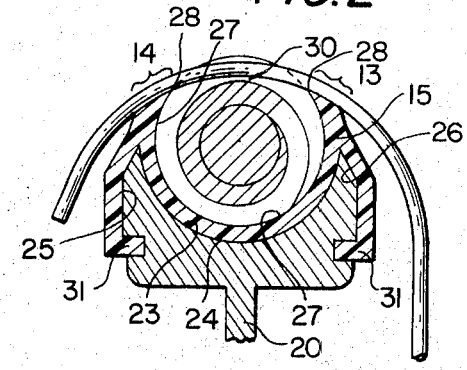
FIG. 2 is a cross-sectional view of FIG. 1, taken in a plane perpendicular to the conveying direction.

As shown more clearly in FIG. 2, the upper portion of the rail 20 is provided with an arcuate inner surface 23, which is preferably a portion of a circle in the cross-section of FIG. 2 of less than 180 degrees. The strip 15 is provided with a mating exterior surface 24 completely engaging and covering the surface 23, and immediately adjacent opposed interior surfaces 25, 26 that cover the outer opposite side surfaces of the upper rail portion that form the opposed legs or sides of the channel. The strip 15 further has what in effect is an outside surface, although the inside of the channel engagingly receiving the shaft 18, which strip surface 27, in the cross section of FIG. 2 perpendicular to the conveying direction is generally an arc of a circle substantially greater than 180° and of substantially the same diameter as or slightly greater than the outer diameter of the shaft 18, more precisely, the outer diameter of the threads 17.

With rigid material for strip 15 requiring axial assembly of the shaft within the strip, there is rigid interference between the strip 15 and the shaft 18 that would prevent the shaft from moving laterally out of the open channel due to the inturned actue angle terminal lips of the strip 15 having sharp edges 28.

As a second embodiment, the strip material may be sufficiently resilient that the shaft during assembly may be moved transversely into the channel to resiliently spread the lips apart to permit entry, after which the lips will snap back to their original extruded shape.

With vertical bends for both embodiments, there will be strong forces tending to move the shaft out of the open end of the channel, which will be satisfactorily resisted by the inturned lips having the edges 28.

The terminal end of the hook 12 is provided with a U-shaped or bent end 29, as shown in FIG. 1, that cooperates with the sharp edges 28 of the strip lips to prevent entry of the hook terminal end within the channel, when the hook is carelessly placed upon the conveyor. Thus, the hook will not damage the interior surface of the the strip channel.

The vertical forces between the hanger 11 and rail or shaft, that is the load, are fully carried by the strip 15 and transferred directly to the structural rail 20. This is accomplised with the structure as specifically shown in FIG. 2, wherein there is a space 30 between the central portion 16 of the hook 12 and the root of the threads, so that there is generally no load carrying vertical engagement between the load supporting hook and the shaft 18; generally, the only engagement between the hanger hook 12 and the shaft 18 will be at one or the other side, depending upon the direction of drive or conveying.

As shown, it is the surface engagement areas 13, 14 that transfer the entire vertical gravity load of the hook 12 to the stationary conveyor portion, which will only be the strip 15 and rail 20. Directly vertically below the areas 13, 14, the strip 15 is in full engagement with the rail 20 for direct transfer of this load to the heavier and stronger rail.

Since the support areas 13, 14 are widely spaced from each other, they will prevent or dampen rocking of the hanger and thus the suspended load 10 within the plane of FIG. 2. They will tend to prevent rocking of the hanger and load, or twisting, within a horizontal plane passing through the axis of the shaft 18, similarly due to their spacing. Further, the material for the strip 15, as mentioned above, has good bearing characteristics to greatly reduce the friction between the hook 12 and its load supporting surfaces 13, 14, to correspondingly reduce the driving power for the shaft 18 and increase the capacity for carrying the load 10. Further, the rather large supporting areas 13, 14 will greatly reduce wear concentration.

The friction between the shaft 18 and channel is greatly reduced by the bearing properties of the material for the strip 15, thus reducing the power necessary for driving the shaft 18, reducing wear, and increasing load capacity. There will be no necessity for providing lubrication within the channel that would create dirt problems.

The conditions for high friction between the shaft and channel for this class of conveyor are considerable due to the relatively sharp bends mentioned above that may be desirable for the conveyor and the sturdy construction of the shaft that inherently produces stiffness. This is particularly true with respect to bends within a vertical plane, where the shaft will tend to move out of the channel and is resisted only by the portions of the surface 27 that would project downwardly in FIG. 2. The wedging action between these surfaces and the shaft would further increase the friction problems with respect to vertical bends.

In the embodiment of FIG. 2, the strip 15 is preferably secured to the rail 20 by means of a snap fit employing inturned projections 31 of the strip 15 that are received within similarly formed grooves in the sides of the rail 20. Preferably, the strip 15 is extruded to substantially the exact shape shown in FIG. 2, so that the surface portions at 26 of the rail will act as cams to flex the projections 31 outwardly so that they may move to where they may snap into the above-mentioned grooves due to the inherent resiliency of material forming the strip 15. Thus, a tight connection will be formed which will prevent the separation of the strip 15 and rail 20. This connection may be enhanced by means of a bonding agent, for example an adhesive, between the engaging surfaces of the strip 15 and rail 20.

While it is preferable that the strip 15 is extruded in substantially the exact shape of FIG. 2, the lips having the edges 28 may in fact be extruded slightly closer to each other than in the assembled configuration of FIG. 2 so that they will be biased into engagement with the shaft 18 for preventing rattling, or other vibrations, according to a further modification.

Figure 3:
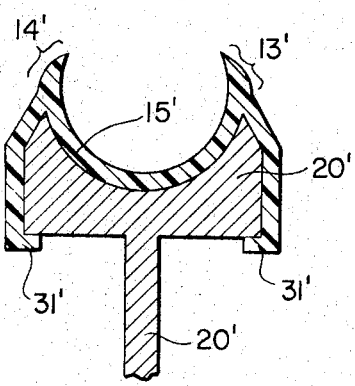
FIG. 3 is a cross-sectional view of a second embodiment of the present invention, taken in the same plane as FIG. 2, but without the hanger and shaft.

In the embodiment of FIG. 3, all of the above description applies except for the differences that will be specifically set forth below, so that the corresponding structure and function between the two embodiments will not be described again. The projections 31' function in the same manner as the projections 31 of FIG. 2, but engage under the lower side flanges of the rail 20' so that side grooves do not have to be formed within the rail 20'. Again, a bonding agent may be employed, although it is not needed with this snap fit.

Figure 4:
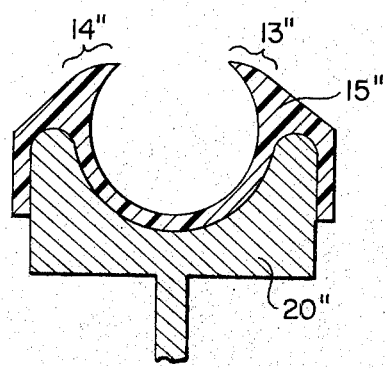
FIG. 4 is a partial cross-sectional view similar to FIG. 3, but of a third embodiment.

The embodiment as shown in FIG. 4 is substantially the same as the previous embodiments, so that duplicated structure will not be described and only the differences between the embodiment of FIG. 4 and the previous embodiments will be described below. In FIG. 4, the inturn projections 31, 31' of the embodiments of FIGS. 1–3 are eliminated and the strip 15 is bonded to the rail 20, preferably by the employment of an intermediate adhesive. All of the advantages of the previous embodiments are retained except of those mentioned with respect to the securement of the strip to the rail.

Figure 5:
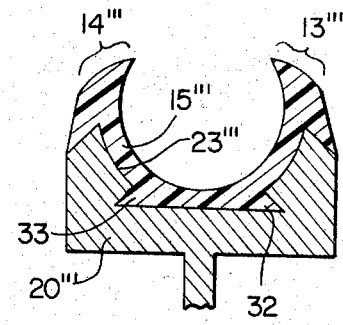
FIG. 5 is a partial cross sectional view similar to FIG. 4, but of a fourth embodiment according to the present invention.

The embodiment of FIG. 5 employs structure identical to that previously described with respect to the other embodiments, with corresponding function, which will not be described in detail, and only the differences between the embodiment of FIG. 5 and the previous embodiments will be set forth below. The previously mentioned inturn projections 31, 31' are not present in the embodiment of FIG. 5 and further the strip 15''' does not extend as far down the sides of the rail 20'''. However, the support areas 13''' and 14''' are as large and function in the same manner as the corresponding support areas 13, 14, 13', 14', 13'', 14'' of the previously specifically described embodiments. Further, the load from these surfaces is just as efficiently transferred to the rail 20''' as in the previous embodiments despite the absence of the side pieces. The strip 15''' is secured to the rail 20''' by means of projections 32, 33 that have a snap fit within corresponding grooves formed within the surface 23''' of the rail 20'''. The adjacent upper arcuate portions of the surface 23''' will function as cams to resiliently deform the projections 32, 33 inwardly toward each other, with some twisting so that they may thereafter snap into the above-mentioned grooves to prevent removal of the strip 15''' from the rail 20''' under normal operating conditions. Although not necessary, adhesive may be provided between the engaging surfaces of the strip 15''' and the rail 20'''.

Since the function of the various components and the operation of the conveyor has been described along with the structure above, no further description is believed necessary.

While the above embodiments have been set forth with respect to the conveying articles by means of a hanger engaging the threads of the cable, it is understood that other types of load engagement or connection may be employed. For example, the load may be carried on pallets having lower flanges that will supportingly engage the surfaces 13, 14, 13', 14', 13'', 14'', 13''', 14''' while at the same time being driven by the threads 17, with parallel conveyor runs being employed. Also, the articles being conveyed themselves may have depending flanges, for example paint cans or special purpose intermediate supports may be employed.

While preferred embodiments of the present invention, along with various modifications and different intended uses have been specifically set forth above as examples and for the advantages of their specific structure according to the more narrow aspects of the present invention, further embodiments, modifications and variations are contemplated according to the broader aspects of the present invention, all as defined within the spirit and scope of the following claims.

What is claimed is:

1. A screw type conveyor, comprising; an elongated rigid support having an upper portion; an elongated bearing material strip generally coextensive with and overlying the upper portion of said support; said strip having an outwardly opening channel defined by a surface that is a substantial portion of a circle, in cross section perpendicular to the drive shaft axis of rotation, which extends for substantially more than 180° and further by opposed channel legs each of said legs having an outwardly facing exposed support surface immediately adjacent said channel; said outwardly facing support surface constituting means for supporting the weight of articles being conveyed; and rotatable means for threadably and drivingly engaging a load drive member, including an elongated flexible drive shaft having helical thread means on its outer surface and being received within said channel; and said drive shaft being circular and having an outer diameter substantially the same as the inner diameter of said arcuate channel surface, and being thus overlapped by the channel legs to positively interfere with movement of the shaft out of the channel in a direction perpendicular to its axis of rotation.

2. The conveyor of claim 1, including said strip further having depending side pieces integrally connected at one edge to said channel legs and having at the opposite edges inturned opposed projections; and said support having shoulders generally facing in the opposite direction from the arcuate channel opening and engaging said projections to positively interfere with removal of said strip from said support.

3. The conveyor of claim 2, wherein said support includes oppositely opening side grooves forming said shoulders and receiving therein said projections.

4. The conveyor of claim 1, wherein the surface of said strip opposite from said arcuate channel is provided with oppositely and outwardly pointing projections; said support is provided with opposed inwardly opening grooves receiving therein said projections; and said projections and grooves constituting means positively preventing disassembly of said strip and support.

5. The conveyor of claim 1, including said channel legs each terminating in an acute angle lip having a sharp edge resiliently bearing aginst the outer diameter of said drive shaft; and said lips having an unstressed spacing therebetween substantially less than the spacing therebetween when assembled with the drive shaft, to resiliently press against the shaft outer surface.

6. The conveyor of claim 1, wherein said shaft outer diameter is approximately 0.010 inches smaller than said channel surface inner diameter to provide optimum clearance for reduced friction and secure guiding.

7. The conveyor of claim 1, wherein each of said leg support surfaces, in cross section perpendicular to the drive shaft of rotation, is arcuate and is coextensive with an arcuate path that passes between the inner and outer thread diameters of said shaft midway between said legs and is at all times spaced a substantial distance from the inner thread diameter of said shaft to constitute means for supporting the entire vertical load of a hook with said arcuate path shape for sliding contact with engagement between the hook and shaft being only generally in the axial direction.

* * * * *